(12) United States Patent  
Yang et al.

(10) Patent No.: US 11,800,165 B2  
(45) Date of Patent: Oct. 24, 2023

(54) VIRTUAL LIVE STREAMING METHOD AND APPARATUS, DEVICE AND STORAGE MEDIUM

(71) Applicant: GUANGZHOU HUADUO NETWORK TECHNOLOGY CO., LTD., Guangdong (CN)

(72) Inventors: Ziguo Yang, Guangdong (CN); Lin Chen, Guangdong (CN)

(73) Assignee: GUANGZHOU HUADUO NETWORK TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/032,186

(22) PCT Filed: Apr. 14, 2021

(86) PCT No.: PCT/CN2021/087168  
§ 371 (c)(1),  
(2) Date: Apr. 16, 2023

(87) PCT Pub. No.: WO2022/077881  
PCT Pub. Date: Apr. 21, 2022

(65) Prior Publication Data  
US 2023/0291949 A1 Sep. 14, 2023

(30) Foreign Application Priority Data  
Oct. 16, 2020 (CN) .......................... 202011112815.0

(51) Int. Cl.  
*H04N 21/218* (2011.01)  
*H04N 21/262* (2011.01)  
*H04N 21/2187* (2011.01)

(52) U.S. Cl.  
CPC ... *H04N 21/26208* (2013.01); *H04N 21/2187* (2013.01)

(58) Field of Classification Search  
CPC ..................... H04N 21/26208; H04N 21/2187  
See application file for complete search history.

(56) References Cited

U.S. PATENT DOCUMENTS

2020/0213368 A1 7/2020 Rangel et al.  
2020/0336769 A1* 10/2020 Li .......................... H04L 9/0637  
(Continued)

FOREIGN PATENT DOCUMENTS

CN 107197384 A 9/2017  
CN 109120965 A 1/2019  
(Continued)

OTHER PUBLICATIONS

International Search Report for PCT/CN2021/087168 dated Jul. 2, 2021, ISA/CN.

*Primary Examiner* — Alazar Tilahun  
(74) *Attorney, Agent, or Firm* — Yue (Robert) Xu; Apex Attorneys at Law, LLP

(57) ABSTRACT

A method for virtual live streaming, a device, and a storage medium thereof are provided. The method includes: polling a broadcasting task list, and triggering a start event for a virtual live streaming task in the broadcasting task list in a case that the virtual live streaming task meets a preset start condition, where the broadcasting task list is to maintain a state of a live streaming task on a network live streaming platform; creating a live streaming room in response to the start event, and associating the live streaming room with a virtual anchor account to which the virtual live streaming task belongs; generating a stream-pushing address, calling a streaming media resource pre-configured for the virtual live streaming task and pushing the streaming media resource to the stream-pushing address; and adding an access portal of the live streaming room into a live streaming room list.

15 Claims, 3 Drawing Sheets

(56) References Cited

U.S. PATENT DOCUMENTS

| | | | |
|---|---|---|---|
| 2021/0368223 A1* | 11/2021 | You | H04N 21/2187 |
| 2022/0141500 A1* | 5/2022 | Du | H04N 21/488 |
| | | | 725/116 |
| 2022/0224950 A1* | 7/2022 | Zhang | H04N 21/658 |

FOREIGN PATENT DOCUMENTS

| | | |
|---|---|---|
| CN | 109246440 A | 1/2019 |
| CN | 109274982 A | 1/2019 |
| CN | 110958465 A | 4/2020 |
| CN | 111225225 A | 6/2020 |
| CN | 112218127 A | 1/2021 |

* cited by examiner

VIRTUAL LIVE STREAMING METHOD AND APPARATUS, DEVICE AND STORAGE MEDIUM

CROSS REFERENCE OF RELATED APPLICATION

The application is the national phase of International Application No. PCT/CN2021/087168, titled "VIRTUAL LIVE STREAMING METHOD AND APPARATUS, DEVICE AND STORAGE MEDIUM", filed on Apr. 14, 2021, which claims priority to Chinese Patent Application No. 202011112815.0, titled "VIRTUAL LIVE STREAMING METHOD AND APPARATUS, DEVICE AND STORAGE MEDIUM", filed on Oct. 16, 2020 with the China National Intellectual Property Administration, both of which are incorporated herein by reference in their entireties.

FIELD

The present disclosure relates to the technical field of control of live video webcast, in particular to a method for virtual live streaming, an apparatus for virtual live streaming, an electronic device, and a non-volatile storage medium.

BACKGROUND

As an operation mode in the Internet, a live streaming outputs high-quality videos to attract traffics and cash the traffics. A platform provider who sets up a network live streaming service pays more attention to an overall traffic over the platform. Growth and stability of traffics relies on both loyalty and activeness of a large number of audience users on the platform, and output of high-quality videos by anchor users for attracting the audience users.

In practical operation, there are generally a prime time period and a non-prime time period for the live streaming, due to influence of time-based activities of the users. During a prime time period, both the anchor users and the audience users are active, and therefore a video is less likely to become a bottleneck for development of the platform. During the non-prime time period, traffic per unit time is not as much as that in the prime time period. For example, a time period from 2:00 am to 5:00 am is an instance of the non-prime time period, during which few anchor users and audience users are online. However, the non-prime time period is known as a long tail time period for the platform of network live streaming. Although peak concurrent users in the non-prime time period are not so many as in the prime time period, an overall traffic in the non-prime time period is higher than that in the prime time period. In addition, the anchors exhibit different levels of attractiveness to the traffic. The traffic with respect to certain anchor from 2:00 am to 5:00 am is still high. Therefore, ensuring the output of high-quality live streaming in the non-prime time period is critical to cashing the traffics.

One solution is to provide on-demand playback to a user in a case that the number of online anchors is insufficient. However, the on-demand playback is unidirectional and cannot provide interaction features with the user. The interactive live streaming is critical to cashing the traffic. Therefore, outputting a sufficient amount of high-quality interactive live content constantly is an important approach to solve the problem.

There are conventional technologies for initiating a virtual anchor and start a virtual live streaming. Such technologies focus on a design of a virtual image of the virtual anchor, or a matching between video content and a personal preference of a user. Generally, the conventional technologies fail to solve the problem of assisting in improving an overall traffic over a platform during a non-prime time period. Operation of a live streaming platform is an systematic perspective. A relevant problem is how to realize a smooth access to a conventional network live streaming platform, so as to enable the network live streaming platform to provide a virtual live streaming for meeting the need of improving the overall traffic. Therefore, it is of positive significance to provide a solution to cater to a characteristic of the network live streaming platform.

SUMMARY

An objective of the present disclosure is to provide a method for virtual live streaming, which enables a virtual live streaming technical framework to access to a network live streaming platform. An apparatus for virtual live streaming, an electronic device and a non-volatile storage medium to which the method is applied are further provided.

In order to achieve the objective of the present disclosure, the following technical solutions are provided in the present disclosure.

To achieve the objective of the present disclosure, a method for virtual live streaming is provided. The method includes: polling a broadcasting task list, and triggering a start event for a virtual live streaming task in the broadcasting task list in a case that the virtual live streaming task meets a preset start condition, where the broadcasting task list is to maintain a state of a live streaming task on a network live streaming platform; creating a live streaming room in response to the start event, and associating the live streaming room with a virtual anchor account to which the virtual live streaming task belongs; generating a stream-pushing address for pushing a video stream to the live streaming room, and calling a streaming media resource pre-configured for the virtual live streaming task and pushing the streaming media resource to the stream-pushing address; and adding an access portal of the live streaming room into a live streaming room list for a user to access the live streaming room.

In an embodiment, the method further includes the following post-steps: polling the broadcasting task list, and triggering a stop event for a virtual live streaming task in the broadcasting task list in a case that the virtual live streaming task meets a preset stop condition, where the broadcasting task list is to maintain a state of a live streaming task on a network live streaming platform; and ceasing the virtual live streaming task in response to the stopping event, and stopping pushing a stream to a live streaming room corresponding to the virtual live streaming task, and deleting an access portal of the live streaming room from the live streaming room list.

In an embodiment, the method further includes the following pre-steps: receiving an instruction for creating a task about a virtual anchor account, and adding, to the broadcasting task list, a virtual live streaming task corresponding to the instruction, where the live streaming task includes the start condition and the stop condition.

In an embodiment, the method further includes the following pre-steps: receiving an instruction for creating a task about a virtual anchor account, and adding, to the broadcasting task list, a virtual live streaming task corresponding to the instruction, where the live streaming task includes an address for obtaining the streaming media resource, the start condition, and the stop condition.

In an embodiment, the method further includes the following pre-steps: receiving account configuration information of the virtual anchor account and creating the virtual anchor account, where the configuration information includes a feature of the virtual anchor account.

In an embodiment, the creating the virtual anchor account includes: associating, based on a channel number preset in the account configuration information, the virtual anchor account with a live channel corresponding to the channel number, to add the virtual live streaming task created for the virtual anchor account to a broadcasting task list corresponding to the channel.

In an embodiment, the start condition is set to a time instant for starting the live streaming, and the stop condition is set to a time instant for ceasing the live streaming. The start event of the virtual live streaming task is triggered in a case that a current time instant matches the time instant for starting the live streaming. The stop event of the virtual live streaming task is triggered in a case that a current time instant matches the time instant for ceasing the live streaming.

In an embodiment, the start condition and the stop condition are preset thresholds. The broadcasting task list includes a real live streaming task created by a real anchor account and the virtual live streaming task. The start event of the virtual live streaming task in the broadcasting task list is triggered in a case that a quantity of real live streaming tasks in progress is less than a preset threshold set for the start condition. The stop event of the virtual live streaming task in the broadcasting task list is triggered in a case that a quantity of real live streaming tasks in progress is greater than a preset threshold set for the stop condition In an embodiment, the method further includes: triggering a heartbeat packet periodically during a time period from start of the virtual live streaming task to end of the virtual live streaming task, to maintain execution of the virtual live streaming task To achieve the objection of the present disclosure, an apparatus for virtual live streaming is provided. The apparatus includes: a task polling module, configured to poll a broadcasting task list, and trigger a start event for a virtual live streaming task in the broadcasting task list in a case that the virtual live streaming task meets a preset start condition, where the broadcasting task list is to maintain a state of a live streaming task on a network live streaming platform; a live streaming initiation module, configured to create a live streaming room in response to the start event, and associate the live streaming room with a virtual anchor account to which the virtual live streaming task belongs; a video stream pushing module, configured to generate a stream-pushing address for pushing a video stream to the live streaming room, and call a streaming media resource preconfigured for the virtual live streaming task and push the streaming media resource to the stream-pushing address; and a live streaming publication module, configured to add an access portal of the live streaming room into a live streaming room list for a user to access the live streaming room.

To achieve the objective of the present disclosure, an electronic device is provided. The electronic device includes a central processing unit and a memory. The central processing unit is configured to invoke and execute a computer program stored in the memory to perform the method for virtual live streaming according to the present disclosure.

To achieve the purpose of the present disclosure, a non-volatile storage medium is provided. The non-volatile storage medium stores a computer program implemented based on the method for virtual live streaming according to the present disclosure. The computer program, when invoked and executed by a computer, implements the method.

Advantages of the technical solutions of the present disclosure, compared with the conventional technology, are described below.

According to the present disclosure, the virtual live streaming task is integrated into the broadcasting task list inherent to the network live streaming platform. Broadcasting of the virtual live streaming task is controlled based on the start condition and the stop condition preset for the virtual live streaming task. The virtual live streaming task is associated with the virtual anchor account. The live streaming room corresponding to the virtual anchor account is created for the virtual live streaming task. The live streaming room can provide a user with interactive functions, so that the virtual live streaming can be integrated into a normal live streaming task of the network live streaming. By controlling the start condition and the stop condition, a reasonable arrangement of the virtual live streaming task is realized, and relevant streaming media resource for the virtual live streaming task is provided. The live streaming room corresponding to the virtual live streaming task is added into the live streaming room list of the network live streaming platform for a user to access to the live streaming room. The network live streaming platform is enabled to reasonably deploy and arrange the virtual live streaming task. Therefore, the network live streaming platform is allowed to continuously output a sufficient amount of high-quality video content during a planned time period by means of the virtual live streaming task. The user can communicate and interact with each other via the live streaming room. Thereby, the overall traffic, even in a non-prime time period, is maximized by using technical control, and cashing of the traffic on the network live streaming platform is promoted due to the interactive service of the live streaming room.

Further, according to the present disclosure, the virtual live streaming task is matched with the virtual anchor account and the instantiated live streaming room corresponding to the virtual live streaming task is provided, without any interface of a live streaming room and personal information of another real anchor account. Hence, the live streaming room corresponding to the virtual live streaming task is independently presented to a user of the network live streaming platform. The audience user can not only visit the live streaming room, but also maintain a binding relationship between the audience user and the live streaming room by following the virtual anchor account. Since the streaming media resource pushed to the live streaming room can be pre-configured, the network live streaming platform may plan streaming media resources for different virtual anchor accounts, so as to enrich a content ecology of the live streaming. Thereby, a stickiness of relevant audience users to the live streaming room is further enhanced. In this way, it is ensured that the live streaming room corresponding to the virtual anchor account can serve a relevant audience user for a long time, so that the cashing of traffic related to the audience user is improved.

In addition, with the virtual live streaming technology according to the present disclosure, an unattended and automatic execution of the virtual live streaming task can be realized by simply configuring the virtual live streaming task in advance, with the support of the technology of polling the broadcasting task list. The configuring the virtual live streaming task includes configuring a strategy of starting and ceasing the virtual live streaming task and configuring the streaming media resource. As a result, an efficiency of implementing the network live streaming platform is improved and cost for deployment and maintenance of the network live streaming platform is reduced.

Additional aspects and advantages of the present disclosure are set forth in part in the description below. The aspects and advantages become apparent from the description, or may be learned through practice of the present disclosure.

BRIEF DESCRIPTION OF THE DRAWINGS

The above and/or additional aspects and advantages of the present disclosure will become apparent and easy to understand from the following description of the embodiments in conjunction with the accompanying drawings. In the drawings.

DETAILED DESCRIPTION

Figure 1:
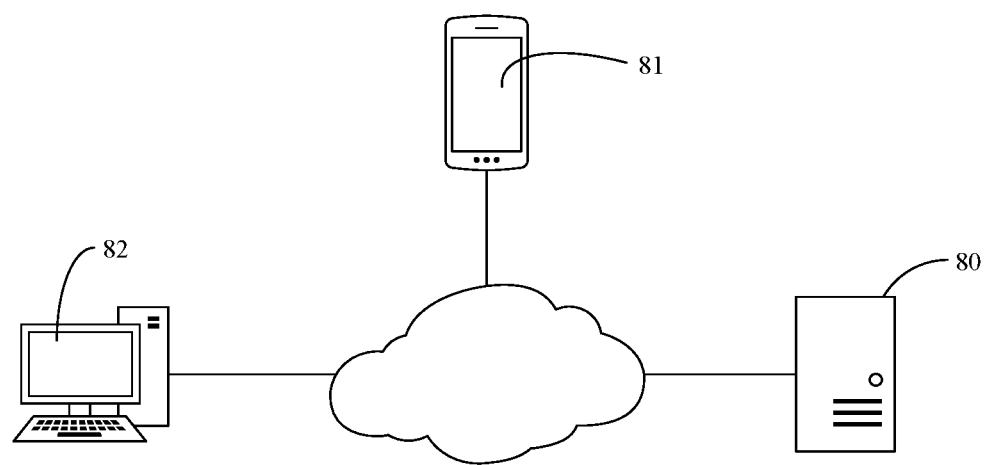
FIG. 1 is a schematic diagram showing a typical network deployment architecture related to an implementation of the technical solution according to the present disclosure.

Embodiments of the present disclosure are described in detail below. Examples of the embodiments are shown in the drawings. Throughout the drawings, the same or similar reference signs denote the same or similar elements or elements having the same or similar functions. The embodiments described below with reference to the figures are merely exemplary, intended to explain the present disclosure, and shall not be construed as a limitation to the present disclosure.

Those skilled in the art can understand that, unless explicitly stated, the singular forms with "a", "an", "said" and "the" herein may indicate plural forms. It should be further understood that the term "comprise/include" in the specification of the present disclosure indicates existence of a feature, integer, step, operation, element and/or component, which does not exclude existence or addition of one or more of other features, integers, steps, operations, elements, components, and/or groups thereof. It should be understood that in a case that an element is referred to as being "connected" or "coupled" to another element, the element may be directly connected or coupled to the other element, or there may be an intervening element there between. Additionally, the terms "connected" or "coupled" herein may include wireless connection or wireless coupling. The expression "and/or" herein includes all or any of listed items and all combinations of the listed items.

Those skilled in the art can understand that, unless otherwise defined, all terminologies (including technical and scientific terms) herein have the same meanings as commonly understood by those of ordinary skills in the art to which the present disclosure belongs. It should also be understood that terms, such as those defined in a general dictionary, should be understood having the meaning consistent with that in the context of the conventional technology, should not be interpreted in an idealized or overly formal sense, unless specifically defined herein.

Those skilled in the art can understand that the "client", "terminal", and "terminal device" herein include a device having a wireless signal receiver (which has no capability of transmitting a wireless signal), and a transceiving hardware device (which is capable of performing bi-directional communication over a bi-directional communication link). Such device may include: a cellular communication device or other communication devices such as a personal computer, a tablet computer, which have a single-line display or a multi-line display or a cellular or other communication device without a multi-line display; a personal communications service (PCS), which can combine speech processing, data processing, fax and/or data communication functions; a personal digital assistant (PDA), which may include a radio frequency receiver, a pager, an Internet/Intranet access, a web browser, a memo notebook, a calendar and/or a global positioning system (GPS) receiver; and a conventional laptop and/or palmtop computers or other devices, which have and/or include a radio frequency receiver. The "client", "terminal", "terminal device" here may be portable, transportable, installed in a vehicle (for air transportation, sea transportation, and/or land transportation), or applied and/or configured to be operated locally and/or in a distributed manner at any other location on the Earth and/or in space. The "client", "terminal" and "terminal device" here may be a communication terminal, an Internet terminal, a music/video playback terminal, such as a PDA, a mobile internet device (MID) and/or a mobile phone with a music/video playback function, or a smart TV, set-top box.

The "server", "client", and "service node" in the present disclosure refers to hardware. The hardware is substantially an electronic device with equivalent functions to a personal computer. The hardware has a central processing unit (an arithmetic device and a controller), a memory, an input device, an output device, and other essential components revealed by the von Neumann principle. A computer program is stored in the memory. The central processing unit invokes the program stored in an external memory into an internal memory, executes instructions in the program, and interacts with the input device and the output device, so as to complete a specific function.

It should be noted that the concept of the "server" in the present disclosure may be apply to a server cluster. Based on a network deployment principle understood by those skilled in the art, each of servers should be logically defined. In a physical space, the servers may be independent from each other but can be invoked through an interface. Alternatively, the servers may be integrated into a single physical computer or a computer cluster. Those skilled in the art should understand that such modification should not limit an implementation of network deployment of the present disclosure.

Reference is made to FIG. 1. A hardware foundation for an implementation of the technical solutions of the present disclosure may be deployed as architecture shown in FIG. 1. According to an embodiment of the present disclosure, a server 80 is deployed on cloud and is mainly serves to provide support to an operation of a live streaming room. The server 80 may be configured to realize a connection among a server for broadcasting of a live streaming room, a streaming media server, and other servers that provide related support, so as to form a server cluster in which servers are logically related to each other. The server cluster provides a service for related terminal devices such as a smart phone 81 and a personal computer 82 as shown in FIG. 1. Both the smart phone and the personal computer may access the Internet through a known manner for network access, and establish a data communication link with the server 80 on the cloud, so as to run a terminal application related to the service provided by the server.

It should be noted that a server supporting operation of a live streaming room, the streaming media server, and a server supporting a broadcast, from the server cluster, are integrated as a single server or a single network address in a certain scenario. Alternatively, the servers may be independent from each other, and association among the servers in the server cluster is established through a same application server. Thereby, a single network address can direct to the server that is ultimately responsible for the service. The above is understandable for those skilled in the art.

In order to support operation of the application, the terminal device is provided with an operating system. The operating system is IOS, HMS, Android, or other operating systems that provide equivalent functions. An application program developed adaptively can run normally with a support of the operating system, thereby realizing a human-computer interaction and a remote interaction.

According to an embodiment of the present disclosure, the method is programmed and embedded in an application servicing for operation of a live streaming room, as a basic function of the application. The application runs on the server.

The live streaming herein refers to a network service for a live streaming room. Such network service is realized based on the aforementioned network deployment architecture.

The live streaming room here refers to a video chat room realized by means of Internet technology. The live streaming room usually has a capability of audio-video broadcasting control. The live streaming room has an anchor user and an audience user. The audience user may be a registered user on the platform, an unregistered user as a visitor, a registered user following the anchor user, or a registered or unregistered user not following the anchor user. The anchor user and the audience user may interactive with each other through speech, video, text, or other well-known manners for online interaction. Generally, the anchor user pushes a video program to the audience user in a form of an audio and video stream. An economic transaction may occur during interaction from the audience user in the live streaming room. In an embodiment of the present disclosure, the anchor user may be associated with a real anchor account or a virtual anchor account. The real anchor account corresponds to a real person. The virtual anchor account corresponds to an anchor user virtually configured by a network live streaming platform, which is realized according to the present disclosure. A difference between the real anchor account and the virtual anchor account is that: a live streaming room associated with the virtual anchor account is automatically operated through a computer program based on preset configuration information; while a live streaming room associated with the real anchor account is operated and controlled mainly by a real person. The live streaming room is applicable for online entertainment, education and training, video conference, product promotion and sales, or other scenarios requiring interaction.

The virtual live streaming task here is defined in comparison with a real live streaming task initiated by the real anchor account. The virtual live streaming task is associated with a virtual anchor account in advance and is constructed based on configuration information of the network live streaming platform. The virtual live streaming task, when invoked, triggers and performs a live streaming activity according to a strategy, and outputs a preconfigured streaming media resource to a user. The virtual live streaming task and the real live streaming task exhibit no difference to the user in terms of technologies and operations. In terms of perception, the virtual anchor account may be associated with a robot program. The robot program may simulate a real person in the live streaming room and perform information interaction with the audience user. In this way, it is difficult for the audience user in the live streaming room to perceive that the live streaming room belongs to a virtual anchor account rather than a real anchor account. Apparently, a perception accuracy of the user depends on intelligence level of the robot program.

It should be noted by those skilled in the art that although the method according to various embodiments of the present disclosure are described based on a same concept and thereby have commonness with each other, the embodiments can be executed independently, unless otherwise specified. Similarly, the embodiments disclosed in the present disclosure are all provided based on the same inventive concept. Therefore, concepts with a same expression and concepts that are properly modified for convenience with different conceptual expressions should be understood equivalent to each other.

Figure 2:
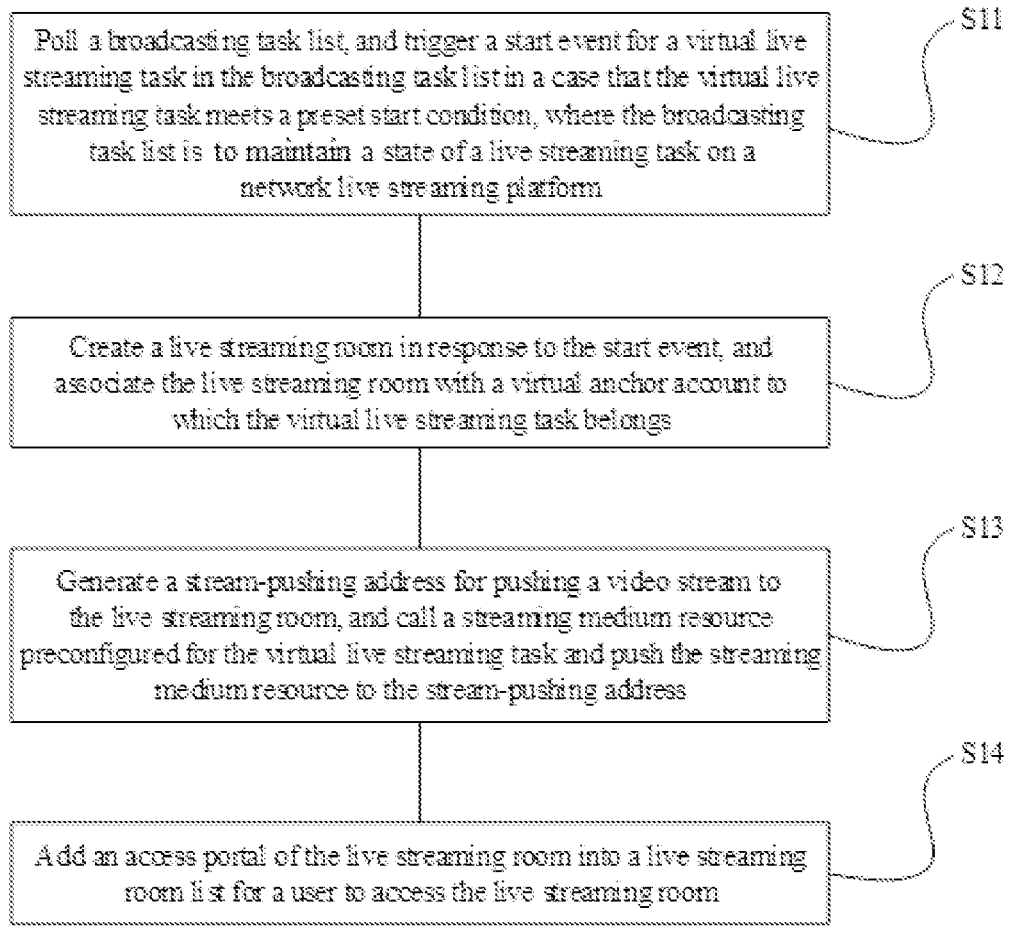
FIG. 2 is a schematic flow chart of a method for virtual live streaming according to a typical embodiment of the present disclosure.

Reference is made to FIG. 2. A method for virtual live streaming is provided according to an embodiment of the present disclosure. The method is programmed and implemented on a server side in an application program providing a live streaming room service. In an embodiment, the method includes steps S11 to S14 as follows.

In S11, a broadcasting task list is polled and a start event for a virtual live streaming task in the broadcasting task list is triggered in a case that the virtual live streaming task meets a preset start condition, where the broadcasting task list is to maintain a state of a live streaming task on a network live streaming platform.

This step may be implemented as a backend service process resided and run in the memory, in order to maintain a polling of one or more live streaming tasks included in the broadcasting task list. During the polling, different processes are performed based on a configuration strategy of each of the live streaming tasks.

The broadcasting task list is a task queue constructed by the network live streaming platform in order to maintain normal live streaming services. A data record contained in the broadcasting task list describes a live streaming task. As mentioned above, there may be at least two categories of the live streaming task, i.e., a real live streaming task initiated by a real anchor user (corresponding to a real anchor account) on the network live streaming platform, and a virtual live streaming task configured, according to the present disclosure, to be associated with a virtual anchor account (equivalent to a virtual anchor user). It can be understood that each live streaming task is generally associated with either a real anchor account or a virtual anchor account. Therefore, each live streaming task in the broadcasting task list is generally required to include configuration information about an anchor user, such as information of a unique feature of the anchor user.

The live streaming task is described below. The real live streaming task is executed according to a business logic inherent to the network live streaming platform. The virtual live streaming task is executed automatically based on manually-configured information. With the manually-configured information, the live streaming service is instructed to trigger execution or cease of the virtual live streaming task, and call related streaming media resource, and the like. Apparently, such configuration information required for the virtual live streaming task may not be necessary for the real live streaming task due to such information is completely controlled by the real anchor user.

In an embodiment, given the difference between the real live streaming task and the virtual live streaming task, the real live streaming task and the virtual live streaming task may be placed in two broadcasting task lists parallel to each other. In this case, the live streaming service process is able to coordinate between the real live streaming task and the virtual live streaming task about their relationship and data, so that the real live streaming task and the virtual live streaming task can be executed in parallel without any conflict. This may be implemented by those skilled in the art after reading the description of the present disclosure.

The virtual live streaming task is described in the broadcasting task list in a form including the following factors. An association between the virtual live streaming task and the virtual anchor account is configured. In addition, it is mainly necessary to configure a start condition, a stop condition, and an address of a streaming media resource.

The start condition and the stop condition represent an operation strategy of the virtual live streaming task, which pertains to policy configuration information. The start condition is to control start of the virtual live streaming task, and the stop condition is to control cease of the virtual live streaming task. The start condition and the stop condition may be defined in different forms, depending on different operation strategies. Some examples are described below.

In an implementation, the start condition and the stop condition are set as time values, in a case that a time-based strategy is considered. That is, time instants to start and cease a virtual live streaming task are set (which is referred to as a start time and a stopping time of the virtual live streaming task). In this way, the live streaming service may execute a virtual live streaming task when determining that a present time arrives at the start time of the virtual live streaming task. The live streaming service may cease a virtual live streaming task that is on execution when determining that a present time arrives at the stopping time of the virtual live streaming task. Apparently, this operation strategy is suitable for starting the virtual live streaming task depending on a time period. The network live streaming platform may set the start time and the stopping time of the virtual live streaming task within a non-prime time period (such as 2 am to 5 am), and thereby achieve an automatic execution of the virtual live streaming task during the non-prime time period. In this way, more high-quality video resources are delivered to the network live streaming platform, relevant user traffic is attracted, and the traffic can be cashed.

In another embodiment, the start condition and the stop condition are set as preset thresholds, in a case that a strategy based on a total quantity of real live streaming tasks in progress on the network live streaming platform is considered. A main function of the preset thresholds is to identify thresholds for triggering a virtual live streaming task. In an implementation, the live streaming service may determine a total quantity of real live streaming tasks in progress in real time (that is, a total quantity of real anchor users who are delivering a live stream at present), and compare whether the total quantity is less than the preset threshold set for the start condition. Execution of one or more virtual live streaming tasks are triggered in a case that the total quantity of real live streaming tasks in progress is less than (alternatively, less than or equal to). Similarly, execution of one or more virtual live streaming tasks is ceased in a case that the total quantity of real live streaming tasks in progress is greater than the preset threshold set for the stop event. It can be understood that the preset threshold for the start condition is generally less than the preset threshold for the stop event. In a special case, the preset threshold for the start condition may be equal to the preset threshold for the stop event. In another aspect, besides setting the preset thresholds for each virtual live streaming task independently, the preset thresholds may be set independently from the virtual live streaming task so as to simplify development and management. In this way, an operation and maintenance personnel may need to configure only one set of preset thresholds, which can be used to control multiple virtual live streaming tasks synchronously. In a further implementation, the total quantity of live streaming tasks in progress is controlled with a certain range, so as to save overhead on a server. In this way, limited quantity of virtual live streaming tasks can be executed based on the preset thresholds, even if there is a large quantity of virtual live streaming tasks in the broadcasting task list. Therefore, the total quantity of live streaming tasks in progress is maintained within the certain range.

It can be seen that a specific setting of the start condition and the stop condition for the virtual live streaming task depends on an operation strategy adopted by the network live streaming platform. In addition to the two approaches disclosed above, those skilled in the art may set the start condition and the stop condition in combination with other common approaches, which are not exhaustively listed here.

In the present disclosure, the broadcasting task list can be accessed through polling, regardless whether the broadcasting task list is a unified task queue for both the virtual live streaming task and the real live streaming task, or a task queue only for the virtual live streaming task.

In a case that the start condition and the stop condition are set as time values, it is determined, in a polling cycle, that a virtual live streaming task meets the start condition on determining that the start time configured for the virtual live streaming task matches a present time, that is, the start time is not later than the present time. Hence, a start event corresponding to the virtual live streaming task may be triggered, so as to execute the virtual live streaming task in response to the start event. Similarly, on determining that the stop time configured for a virtual live streaming task in progress matches the present time, that is, the stop time is not later than the present time, a stop event corresponding to the virtual live streaming task may be triggered, so as to cease the virtual live streaming task in response to the stop event.

In a case that the start condition and the stop condition are set as preset thresholds, it is determined, in a polling cycle, that a virtual live streaming task meets the start condition on determining that a total quantity of real live streaming tasks in progress is less than a preset threshold for the start condition configured for the virtual live streaming task. Hence, a start event corresponding to the virtual live streaming task is triggered, so as to execute the virtual live streaming task in response to the start event. It is determined that a virtual live streaming task meets the stop condition on determining that the total quantity of real live streaming tasks in progress is greater than a preset threshold for the stop condition configured for the virtual live streaming task. Hence, a stop event corresponding to the virtual live streaming task is triggered, so as to cease the virtual live streaming.

After the start event and the stop event are triggered, these computer events are broadcasted. Relevant program business logic may respond to the computer events to execute the virtual live streaming task.

In step S12, a live streaming room is created in response to the start event, and the live streaming room is associated with a virtual anchor account to which the virtual live streaming task belongs.

After the start event is triggered in the previous step, business logic related to this step may respond to the start event. First, a dedicated live streaming room for the virtual live streaming task corresponding to the start event is created. The live streaming room is created by using the same instance of a live streaming room as for the real live streaming task. The live streaming room allows a user to play an audio and video stream in the live streaming room, and also allows a user to interact with others, give virtual electronic gifts, and perform other activities for cashing a traffic. In this way, it is ensured that the user has no abnormal perception when visiting the live streaming room, and difficulty in programming and development required to implement the present disclosure is reduced.

It can be understood that the start event may pass attribute information of the virtual live streaming task. The attribute information generally includes a unique feature of the virtual anchor account associated with the virtual live streaming task, and an address of the streaming media resource configured by the network live streaming platform for the virtual live streaming. In this step, the live streaming room may be created based on the above information, so as to realize the association between the live streaming room and the virtual anchor account.

In a process of creating the live streaming room, a creation interface of a description class of the live streaming room is invoked. The unique feature of the virtual anchor account and the address of the streaming media resource are passed to the creation interface. Thereby, a live streaming room object is initiated. The live streaming room object generates information of the live streaming room based on parameters passed by the start event. For example, with the unique feature of the virtual anchor account, a nickname, an avatar, a cover picture, a title, and the like, of the virtual user preconfigured for the virtual anchor account are invoked to encapsulate the live streaming room. As another example, with the address of the streaming media resource, the streaming media resource is invoked for pushing a video stream to the live streaming room.

This step is mainly intended to create a live streaming room instance for a virtual live streaming task. After the live streaming room is successfully created and before the live streaming room is accessible, the following step is further performed in order to realize a complete function, such as video stream pushing, of the live streaming room.

In step S13, a stream-pushing address for pushing a video stream to the live streaming room is generated, and a streaming media resource pre-configured for the virtual live streaming task is called and pushed to the stream-pushing address.

As mentioned above, a pre-configuration intended to meet a requirement for stream pushing is performed after the instance of the live streaming room for the virtual live streaming task is created, in order to realize the stream pushing.

Based on an inherent function of the live streaming room of the live streaming service, after the live streaming room is instantiated to generate the live streaming room object, the stream-pushing address for receiving a streaming media push is generated automatically based on a class definition of the live streaming room object. The audio and video stream is pushed to the stream-pushing address, so that the audio and video stream can be played through the live streaming room on a terminal device on a user side.

In order to provide sufficient and high-quality streaming media resources to the live streaming room for users to view or listen during a virtual live streaming, the network live streaming platform may pre-select a preferred streaming media resource for the virtual live streaming task, and provide an address for obtaining the stream medium resource for the virtual live streaming task when the virtual live streaming task is set.

After the stream-pushing address of the live streaming room instance is generated, the streaming media resource can be obtained based on the address of the streaming media resource configured by the virtual live streaming task, and the streaming media resource is pushed to the stream-pushing address. Thereby, audio and video content is provided for the live streaming room.

The streaming media resource may be selected from video clips or films whose copyrights are possessed by the network live streaming platform. A robot program may be further adopted to provide automatic explanation, or perform intelligent speech interaction with a user in other ways (when necessary). Therefore, a feeling of interaction with a real person is provided for an audience user.

After the stream-pushing address of the live streaming room instance is generated, the address of the pre-configured stream medium resource is invoked, the stream medium resource is obtained, and the audio and video stream is pushed to the live streaming room, preparation for publishing the live streaming room is performed as follows.

In step S14, an access portal of the live streaming room is added to a live streaming room list for a user to access.

With the above-mentioned preparations of the live streaming room of the virtual live streaming task, the access portal of the live streaming room may be opened to users of the network live streaming platform. A backend service of the network live streaming platform generally maintains an operation state of each live streaming room in progress via the live streaming room list. A real-time screen or a summary of the live streaming room are presented representing the access portal of the live streaming room. The access portal is expressed as a hyperlink address in the live streaming room list. Hence, the access portal of the live streaming room is added to the live streaming room list. The backend service displays live streaming rooms to different users according to a certain strategy. The live streaming room realized according to the present disclosure is displayed for a user to access.

It can be understood that after viewing the real-time screen or summary of the live streaming room through a live streaming room application, an audience user may perform a touch operation to enter the live streaming room through the access portal of the live streaming room. Theoretically, the audience user, after entering the live streaming room, can experience a same interface and interactive perception as in a live streaming room corresponding to a real live streaming task. The audience user may not easily notice that the live streaming room is owned by a virtual anchor account, and may be attracted and follow the virtual anchor account and even give a virtual electronic gift to the virtual anchor account.

It is understood that the audience user may select more video content and thereby be willing to stay and act on the network live streaming platform for a longer period of time, in a case that multiple virtual live streaming tasks are published during the long-tail non-prime time period. In this way, an overall traffic constituted by active users in the non-prime time period is enhanced. It is further understood that similar effects can be achieved in a case that multiple virtual live streaming tasks are published during a prime time period. Hence, the implementation of the virtual live streaming task technology is beneficial to activating and cashing the traffic over the network live streaming platform.

In an embodiment for improving the functionality of the backend program for implementing the present disclosure, the following post-steps are performed after the aforementioned steps.

As a prerequisite, the process constantly polls the broadcasting task list. The broadcasting task list is polled and a stop event for a virtual live streaming task in the broadcasting task list is triggered in a case that the virtual live streaming task meets a preset stop condition, where the broadcasting task list is to maintain a state of a live streaming task on a network live streaming platform. Triggering of the stop event depends on the aforementioned operation strategy. For example, the stop event may be triggered based on the stop time or the preset threshold for stopping.

The virtual live streaming task is ceased in response to the stop event. Generally, the access portal of the live streaming room is deleted from the live streaming room list, so that the live streaming room is no longer recommended to a user of the network live streaming platform. In addition, pushing of a stream to the live streaming room is stopped, and the instance of the live streaming room is even deleted from a memory to realize memory recovery.

Correspondingly, data records of the virtual live streaming task in the broadcasting task list may be deleted, or a relevant state may be marked. Therefore, an efficiency of the subsequent polling is not affected.

It can be understood that in the method, the broadcasting task list is continuously polled in step S11. During the polling, a start event or a stop event is triggered based on whether a start condition or a stop condition for a virtual live streaming task meets an operation strategy. The start event is responded in subsequent steps, in which different functions cooperates to ensure execution of the virtual live streaming task.

In an embodiment for improving a configuration function of the method, the method may further include the following pre-steps: receiving an instruction for creating a task about a virtual anchor account; and adding, to the broadcasting task list, a virtual live streaming task corresponding to the instruction, where the live streaming task includes the start condition and the stop condition. An operation and maintenance personnel of the network live streaming platform may implement the steps through a backend management page. In an implementation, the operation and maintenance personnel visits the backend management page, and edit one or more virtual live streaming tasks on the backend management page. The operation and maintenance staff sets the start condition and the stop condition required for the operation strategy corresponding to the virtual live streaming task, the virtual anchor account to which the virtual live streaming task belongs, the address of the streaming media resource, and other configuration information. Then, the instruction for creating a task is submitted to the server and the configuration information is passed to the server. The server responds to the instruction and adds a data record to the broadcasting task list based on the configuration information, so as to complete creation of the virtual live streaming task. It should be noted that the operation and maintenance staff may implement this process through multiple steps and multiple pages. For example, the start condition and the stop condition for the virtual live streaming task may be edited and submitted via a page corresponding to a step, and the address of the streaming media resource corresponding to the virtual live streaming task may be edited and submitted via a page corresponding to another step, and the like. For provision of the address of the streaming media resource, the operation and maintenance staff only need to select content or configure a strategy, the address may be determined by the computer based on the configuration. It can be understood that in this embodiment, convenience and flexibility for operation and maintenance of the network live streaming platform is further improved.

Another embodiment is further provided with a similar purpose as the previous embodiment. According to the embodiment, the method may further include the following pre-steps: receiving account configuration information of the virtual anchor account and creating the virtual anchor account, where the account configuration information includes a feature of the virtual anchor account. In order to implement this step, the backend server may present, for an operation and maintenance staff, a dedicated page for editing the account configuration information of one or more virtual anchor accounts. The operation and maintenance staff may set, through the dedicated page, a nickname, a title, a cover picture, a heading, and other features for the virtual anchor account, with reference to the real anchor account. The features can help to construct a virtual personality of the virtual anchor account and enhance an affinity of the virtual anchor user. The operation and maintenance staff edits and submits the account configuration information to the server. The server may complete the creation of the virtual anchor account based on the account configuration information. The unique feature of the virtual anchor account, such as a UID, may be generated by a machine, so as to identify the virtual anchor account in the program.

On the basis of the previous embodiment, considering a classified management of channels on the network live streaming platform, the network live streaming platform may set an independent broadcasting task list for each of the channels. Therefore, in the process of creating the virtual anchor account, the operation and maintenance staff may designate a channel number. The server establishes an association between the virtual anchor account and a live streaming channel corresponding to the channel number, based on the channel number preset in the account configuration information submitted during creation or maintenance of the virtual anchor account. Thereby, the virtual live streaming task created for the virtual anchor account is added to the broadcasting task list of the channel.

In addition, it is further necessary to maintain normal operation of the virtual live streaming task, avoid a backend server maintaining a live streaming room list from misidentifying a cease of the virtual live streaming task due to failure in identifying an interactive operation from the real anchor use. To this end, a heartbeat packet may be triggered periodically and sent to the server, during a time period from start of the virtual live streaming task to end of the virtual live streaming task. In this way, it is ensured that the server knows that the virtual live streaming task is in progress, and therefore maintains the normal execution of the virtual live streaming task.

Figure 3:
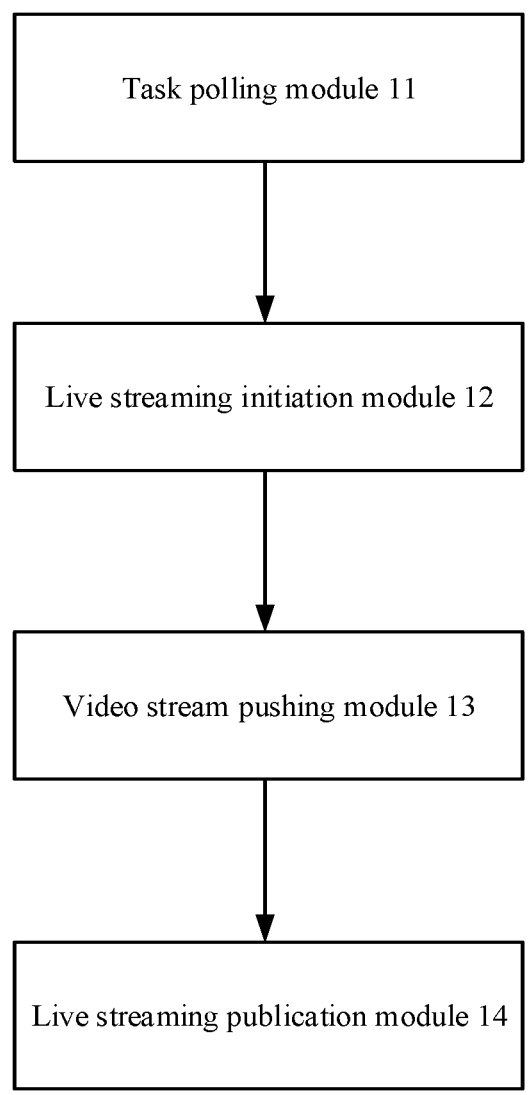
FIG. 3 is a functional block diagram of an apparatus for virtual live streaming according to a typical embodiment of the present disclosure.

An apparatus for virtual live streaming is further provided by functionalizing the steps of the methods disclosed in the above embodiments. Reference is made to FIG. 3. The apparatus according to a typical embodiment includes a task polling module 11, a live streaming initiation module 12, a video stream pushing module 13, and a live streaming publication module 14.

The task polling module 11 is configured to poll a broadcasting task list, and trigger a start event for a virtual live streaming task in the broadcasting task list in a case that the virtual live streaming task meets a preset start condition, where the broadcasting task list is to maintain a state of a live streaming task on a network live streaming platform.

The live streaming initiation module 12 is configured to create a live streaming room in response to the start event, and associate the live streaming room with a virtual anchor account to which the virtual live streaming task belongs.

The video stream pushing module 13 is configured to generate a stream-pushing address for pushing a video stream to the live streaming room, and call a streaming media resource preconfigured for the virtual live streaming task and push the streaming media resource to the stream-pushing address.

The live streaming publication module 14 is configured to add an access portal of the live streaming room into a live streaming room list for a user to access the live streaming room.

In order to facilitate execution of the present disclosure, an electronic device is further provided according to an embodiment of the present disclosure. The electronic device includes a central processing unit and a memory. The central processing unit is configured to invoke and execute a computer program stored in the memory to perform the method for virtual live streaming according to any of the various embodiments as described above.

It can be seen that a non-volatile storage medium is suitable for the memory. By implementing the method as a computer program and installing into a mobile phone, a computer, or other electronic devices, program code and data are stored in the non-volatile storage medium of the electronic device. The central processing unit of the electronic device installs the program from the non-volatile storage medium into an internal memory and executes the program, so that the purpose of the present disclosure can be achieved. Therefore, it can be understood that a non-volatile storage medium may be further provided according to an embodiment of the present disclosure. The non-volatile storage medium stores a computer program implemented based on the method for virtual live streaming. The computer program, when invoked and executed by a computer, implements the method.

With the embodiments of the present disclosure, a smooth access to the virtual live streaming task on the network live streaming platform is realized, an overall traffic of active users over the network live streaming platform during a non-prime time period is improved and the traffic is cashed effectively.

Those skilled in the art can understand that the present disclosure includes one or more devices for performing the operations and methods described in the present disclosure. These devices may be specially designed and manufactured for the required purposes, or may include known devices from a general-purpose computer. Each of these devices has a computer program stored in its memory. The computer program is selectively activated or reconfigured. Such computer program may be stored in a device-readable (such as a computer-readable) medium or may be stored in any type of medium suitable for storing electronic instructions and coupled to a bus. The computer-readable medium may include, but is not limited to, any type of disk (including a floppy disk, a hard disk, a CD, a CD-ROM, and a magneto-optical disk), a read-only memory (ROM), a random-access memory (RAM), an erasable programmable read-only memory (EPROM), an electrically erasable programmable read-only memory (EEPROM), a flash memory, a magnetic card, or an optical card. That is, the readable medium includes any medium that stores or transmits information in a form readable by a device (such as a computer).

Those skilled in the art can understand that computer program instructions can implement each of blocks in at least one of the structural diagram, the block diagram, or the flow chart, and a combination of the blocks in the at least one of the structural diagram, the block diagram, or the flow chart. Those skilled in the art can understand that the computer program instructions can be provided to a general-purpose computer, a dedicated computer, or other processors capable of programing a data processing method. Therefore, the solutions specified in one or more of the blocks in the at least one of the structural diagram, the block diagram, or the flow chart disclosed in the present disclosure is implemented by the computer or the processors.

Those skilled in the art can understand that steps, measures, and solutions in various operations, methods, and processes discussed in the present disclosure can be exchanged, modified, combined, or eliminated. Furthermore, steps, measures, and solutions in other embodiments having the operations, methods, and processes discussed in the present disclosure may be exchanged, modified, rearranged, decomposed, combined, or eliminated. Further, steps, measures, and solutions in the conventional technology having the operations, methods, and processes disclosed in the present disclosure may be exchanged, modified, rearranged, decomposed, combined, or deleted.

Hereinabove described are merely some implementations of the present disclosure. It should be noted that improvements and modifications can be made by those of ordinary skills in the art, without departing from the principle of the present disclosure. Such improvements and modifications shall be regarded within the protection scope of the present disclosure.

The invention claimed is:

1. A method for virtual live streaming, comprising:
polling a broadcasting task list, and triggering a start event for a virtual live streaming task in the broadcasting task list in a case that the virtual live streaming task meets a preset start condition, wherein
the broadcasting task list is to maintain a state of a live streaming task on a network live streaming platform,
the start condition is a preset threshold,
the broadcasting task list comprises a real live streaming task created by a real anchor account and the virtual live streaming task, and
the start event of the virtual live streaming task in the broadcasting task list is triggered in a case that a quantity of real live streaming tasks in progress is less than a preset threshold set for the start condition;
creating a live streaming room in response to the start event, and associating the live streaming room with a virtual anchor account to which the virtual live streaming task belongs;
generating a stream-pushing address for pushing a video stream to the live streaming room, and calling a streaming media resource pre-configured for the virtual live streaming task and pushing the streaming media resource to the stream-pushing address;
adding an access portal of the live streaming room into a live streaming room list for a user to access the live streaming room;
polling the broadcasting task list, and triggering a stop event for a virtual live streaming task in the broadcasting task list in a case that the virtual live streaming task meets a preset stop condition, wherein
the stop condition is a preset threshold, and
the stop event of the virtual live streaming task in the broadcasting task list is triggered in a case that a quantity of real live streaming tasks in progress is greater than a preset threshold set for the stop condition; and ceasing the virtual live streaming task in response to the stop event, and stopping pushing a stream to a live streaming room corresponding to the virtual live streaming task, and deleting an access portal of the live streaming room from the live streaming room list.

2. The method according to claim 1, further comprising the following pre-steps:

receiving an instruction for creating a task about a virtual anchor account, and adding, to the broadcasting task list, a virtual live streaming task corresponding to the instruction, wherein the live streaming task comprises the start condition and the stop condition.

3. The method according to claim 1, further comprising the following pre-steps:

receiving account configuration information of the virtual anchor account and creating the virtual anchor account, wherein the configuration information comprises a feature of the virtual anchor account.

4. The method according to claim 3, wherein the creating the virtual anchor account comprises:

associating, based on a channel number preset in the account configuration information, the virtual anchor account with a live channel corresponding to the channel number, to add the virtual live streaming task created for the virtual anchor account to a broadcasting task list corresponding to the channel.

5. The method according to claim 1, further comprising:

triggering a heartbeat packet periodically during a time period from start of the virtual live streaming task to end of the virtual live streaming task, to maintain execution of the virtual live streaming task.

6. An electronic device, comprising a central processing unit, and a memory storing a computer program, wherein the computer program, when invoked and executed by the central processing unit, configures the electronic device to:

poll a broadcasting task list, and trigger a start event for a virtual live streaming task in the broadcasting task list in a case that the virtual live streaming task meets a preset start condition, wherein the broadcasting task list is to maintain a state of a live streaming task on a network live streaming platform, the start condition is a preset threshold, the broadcasting task list comprises a real live streaming task created by a real anchor account and the virtual live streaming task, and the start event of the virtual live streaming task in the broadcasting task list is triggered in a case that a quantity of real live streaming tasks in progress is less than a preset threshold set for the start condition;

create a live streaming room in response to the start event, and associate the live streaming room with a virtual anchor account to which the virtual live streaming task belongs;

generate a stream-pushing address for pushing a video stream to the live streaming room, and call a streaming media resource pre-configured for the virtual live streaming task and push the streaming media resource to the stream-pushing address;

add an access portal of the live streaming room into a live streaming room list for a user to access the live streaming room;

poll the broadcasting task list, and trigger a stop event for a virtual live streaming task in the broadcasting task list in a case that the virtual live streaming task meets a preset stop condition, wherein the stop condition is a preset threshold, and the stop event of the virtual live streaming task in the broadcasting task list is triggered in a case that a quantity of real live streaming tasks in progress is greater than a preset threshold set for the stop condition; and cease the virtual live streaming task in response to the stop event, and stop pushing a stream to a live streaming room corresponding to the virtual live streaming task, and delete an access portal of the live streaming room from the live streaming room list.

7. A non-volatile storage medium, wherein the non-volatile storage medium stores a computer program, and the computer program, when invoked by a computer, is configured to:

poll a broadcasting task list, and trigger a start event for a virtual live streaming task in the broadcasting task list in a case that the virtual live streaming task meets a preset start condition, wherein the broadcasting task list is to maintain a state of a live streaming task on a network live streaming platform, the start condition is a preset threshold, the broadcasting task list comprises a real live streaming task created by a real anchor account and the virtual live streaming task, and the start event of the virtual live streaming task in the broadcasting task list is triggered in a case that a quantity of real live streaming tasks in progress is less than a preset threshold set for the start condition;

create a live streaming room in response to the start event, and associate the live streaming room with a virtual anchor account to which the virtual live streaming task belongs;

generate a stream-pushing address for pushing a video stream to the live streaming room, and call a streaming media resource pre-configured for the virtual live streaming task and push the streaming media resource to the stream-pushing address;

add an access portal of the live streaming room into a live streaming room list for a user to access the live streaming room;

poll the broadcasting task list, and trigger a stop event for a virtual live streaming task in the broadcasting task list in a case that the virtual live streaming task meets a preset stop condition, wherein the stop condition is a preset threshold, and the stop event of the virtual live streaming task in the broadcasting task list is triggered in a case that a quantity of real live streaming tasks in progress is greater than a preset threshold set for the stop condition; and cease the virtual live streaming task in response to the stop event, and stop pushing a stream to a live streaming room corresponding to the virtual live streaming task, and delete an access portal of the live streaming room from the live streaming room list.

8. The electronic device according to claim 6, further configured to:

receive an instruction for creating a task about a virtual anchor account, and add, to the broadcasting task list, a virtual live streaming task corresponding to the instruction, wherein the live streaming task comprises the start condition and the stop condition.

9. The electronic device according to claim 6, further configured to:
receive account configuration information of the virtual anchor account and creating the virtual anchor account, wherein the configuration information comprises a feature of the virtual anchor account.

10. The electronic device according claim 9, further configured to:
associate, based on a channel number preset in the account configuration information, the virtual anchor account with a live channel corresponding to the channel number, to add the virtual live streaming task created for the virtual anchor account to a broadcasting task list corresponding to the channel.

11. The electronic device according claim 6, further configured to:
trigger a heartbeat packet periodically during a time period from start of the virtual live streaming task to end of the virtual live streaming task, to maintain execution of the virtual live streaming task.

12. The non-volatile storage medium according to claim 7, wherein the computer program, when invoked by a computer, is further configured to:
receive an instruction for creating a task about a virtual anchor account, and
add, to the broadcasting task list, a virtual live streaming task corresponding to the instruction, wherein the live streaming task comprises the start condition and the stop condition.

13. The non-volatile storage medium according to claim 7, wherein the computer program, when invoked by a computer, is further configured to:
receive account configuration information of the virtual anchor account and creating the virtual anchor account, wherein the configuration information comprises a feature of the virtual anchor account.

14. The non-volatile storage medium according claim 13, wherein the computer program, when invoked by a computer, is further configured to:
associate, based on a channel number preset in the account configuration information, the virtual anchor account with a live channel corresponding to the channel number, to add the virtual live streaming task created for the virtual anchor account to a broadcasting task list corresponding to the channel.

15. The non-volatile storage medium according claim 7, wherein the computer program, when invoked by a computer, is further configured to:
trigger a heartbeat packet periodically during a time period from start of the virtual live streaming task to end of the virtual live streaming task, to maintain execution of the virtual live streaming task.

* * * * *